Figure 2:
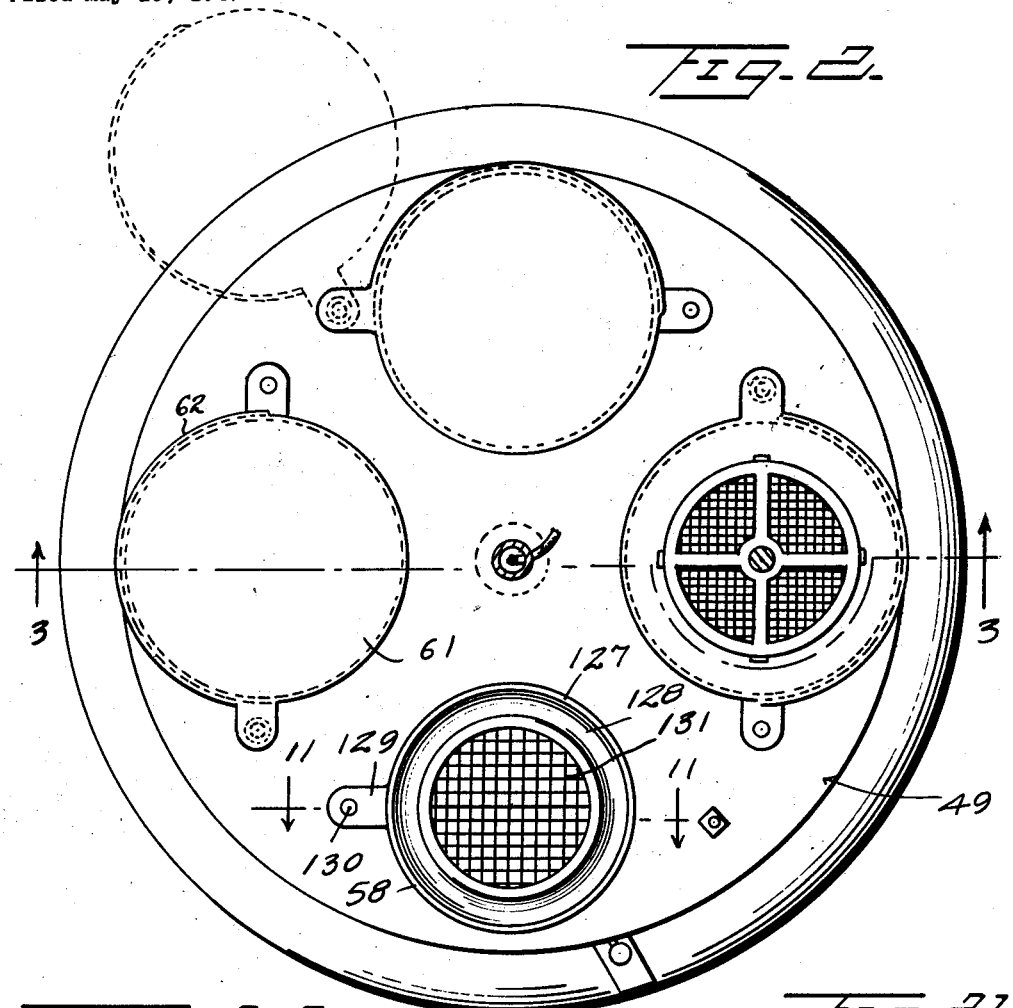

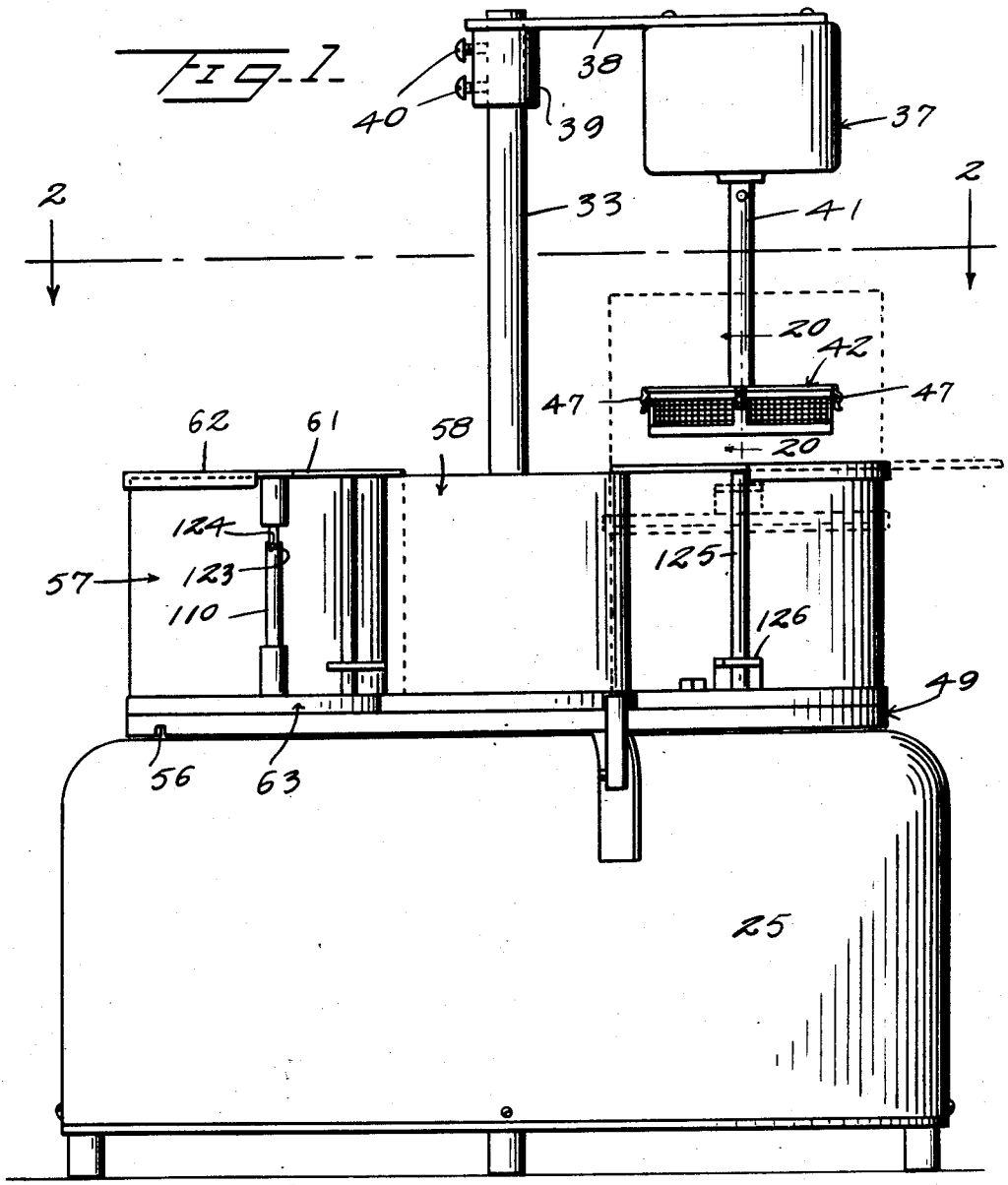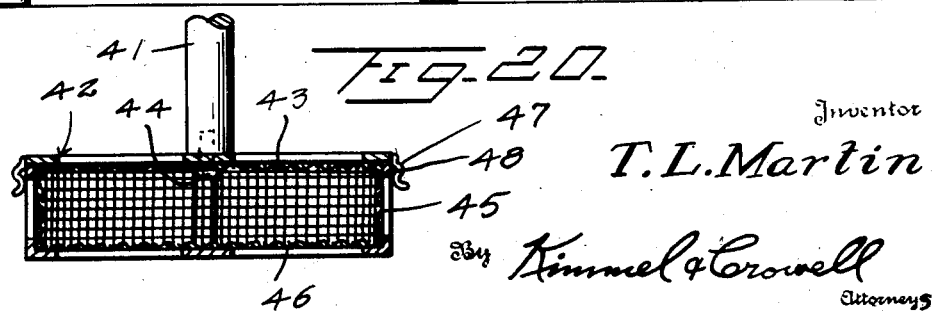

July 28, 1953 — T. L. MARTIN — 2,646,807
WATCH CLEANING MACHINE
Filed May 13, 1947 — 7 Sheets-Sheet 2

Inventor
T. L. Martin
By Kimmel & Crowell
Attorneys

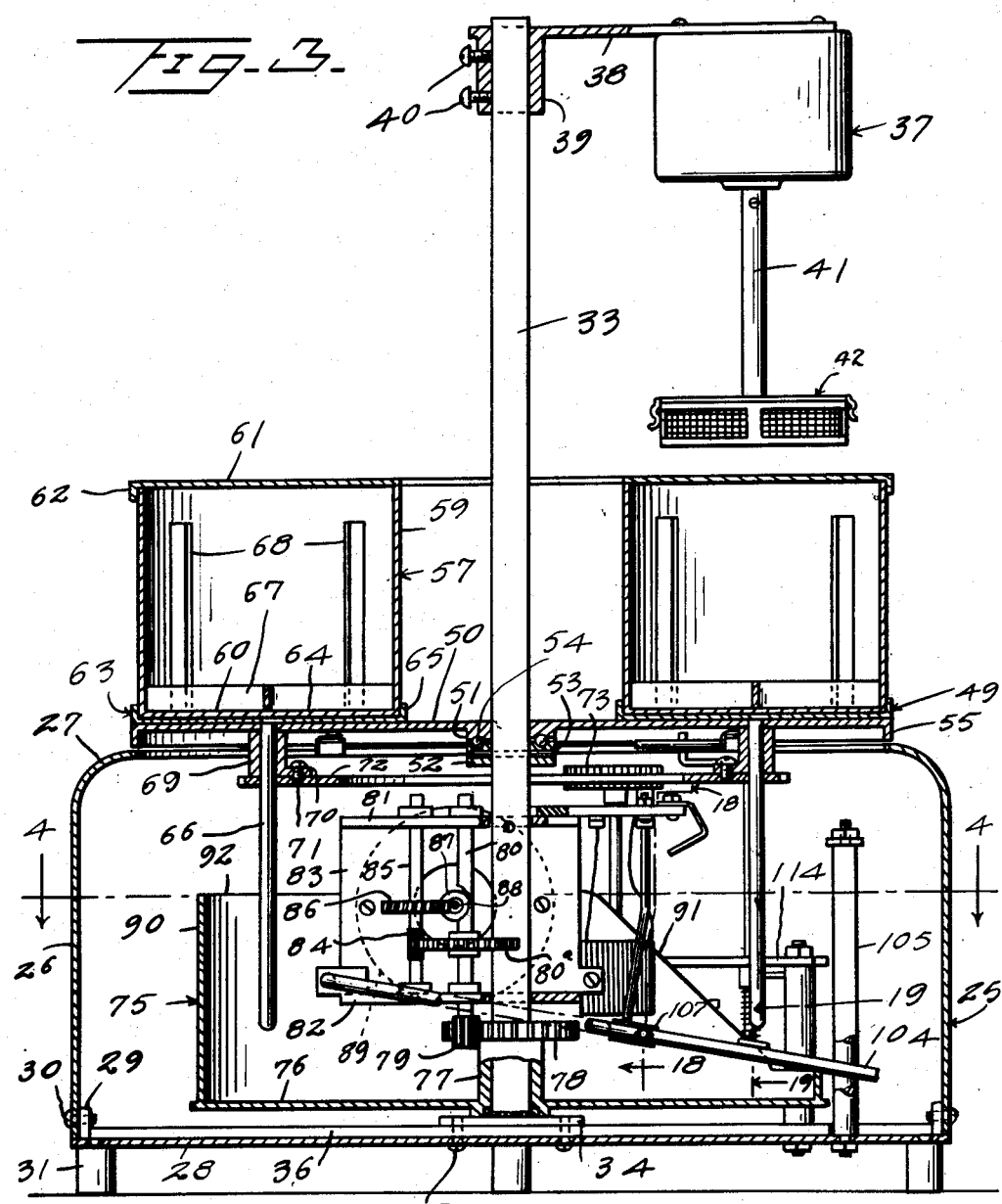
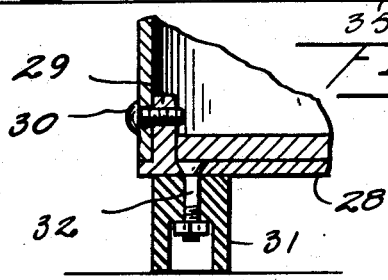

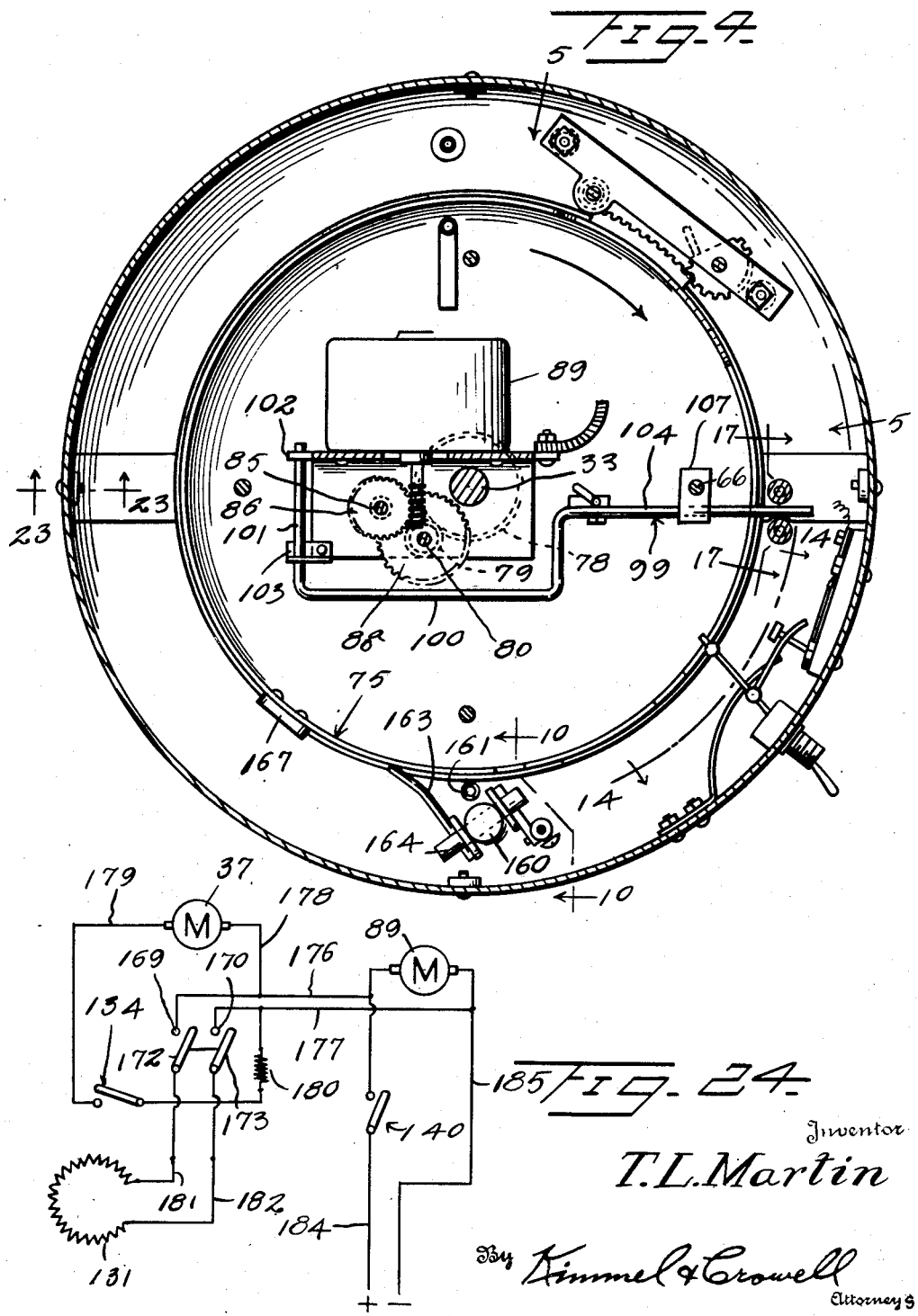

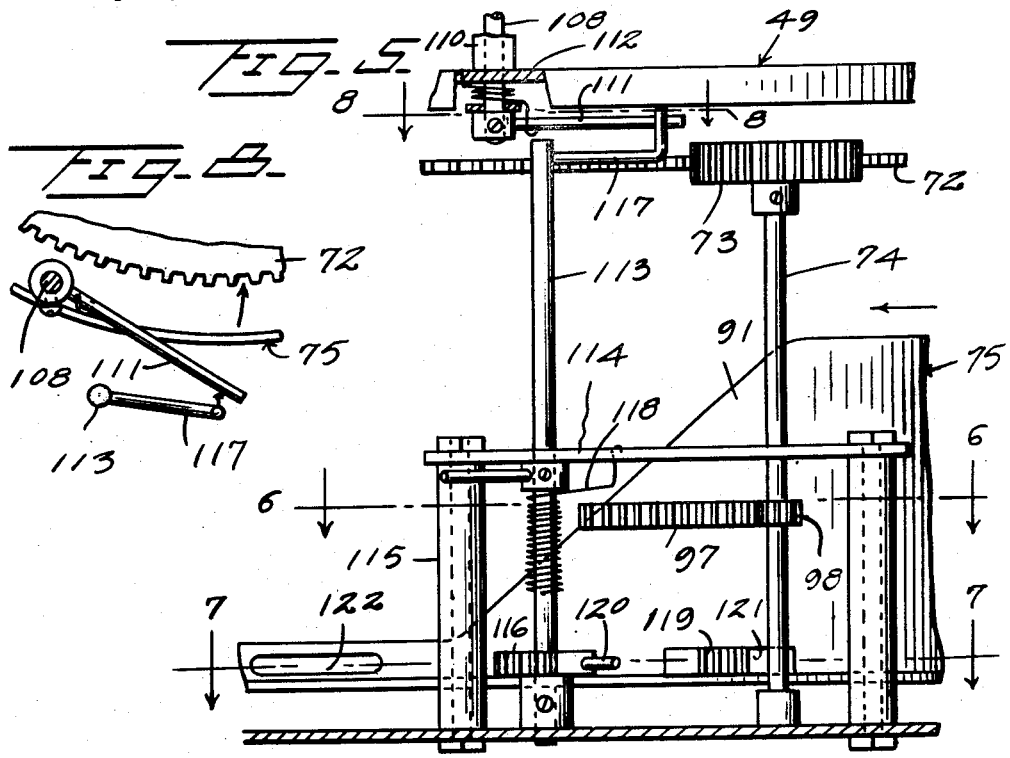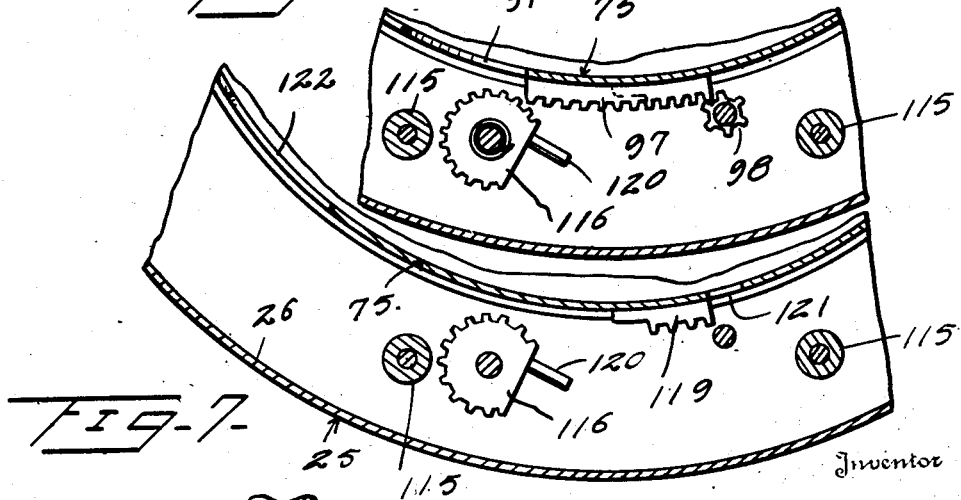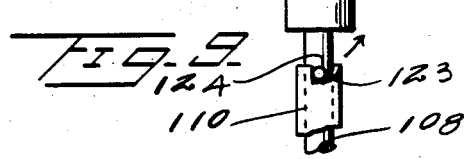

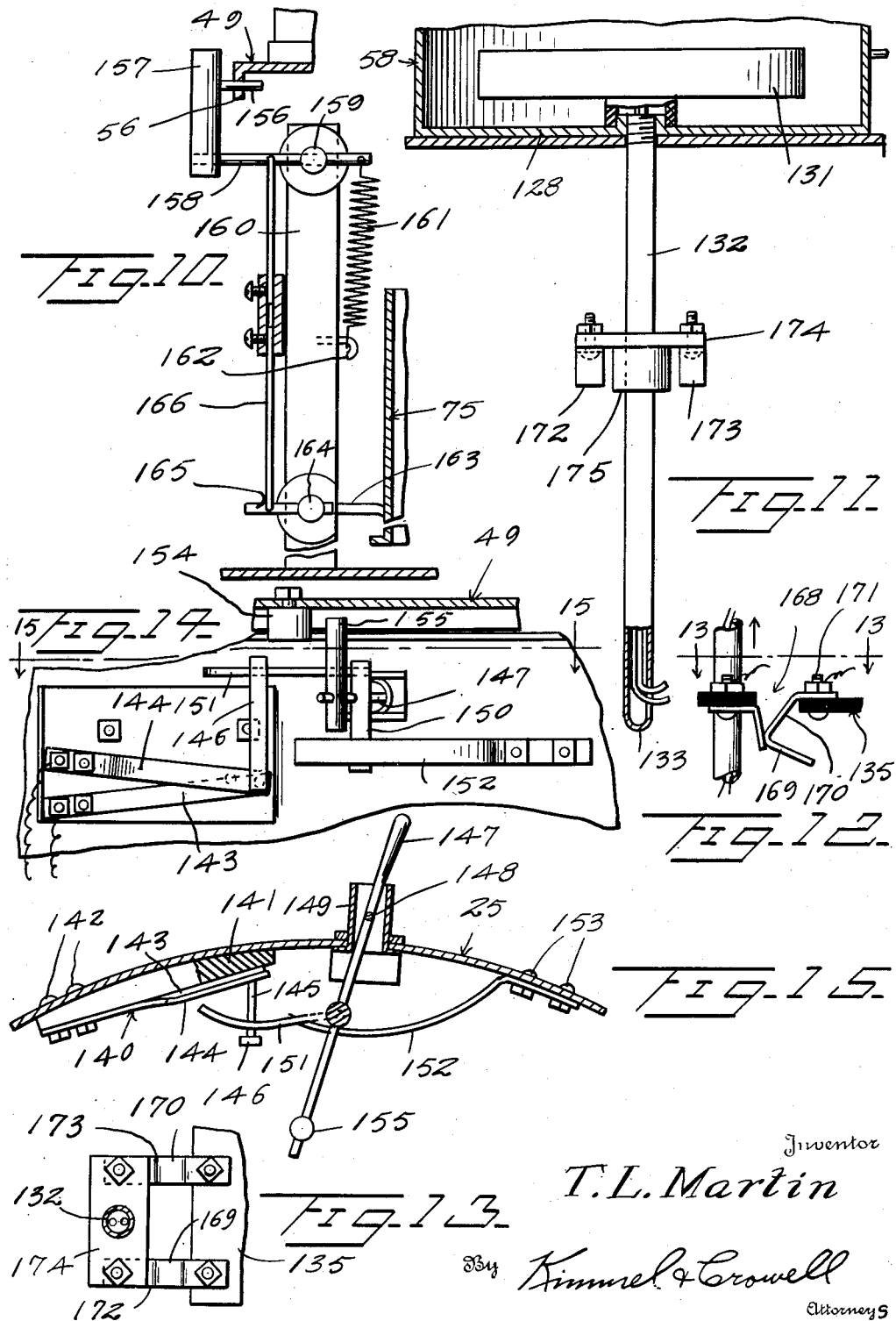

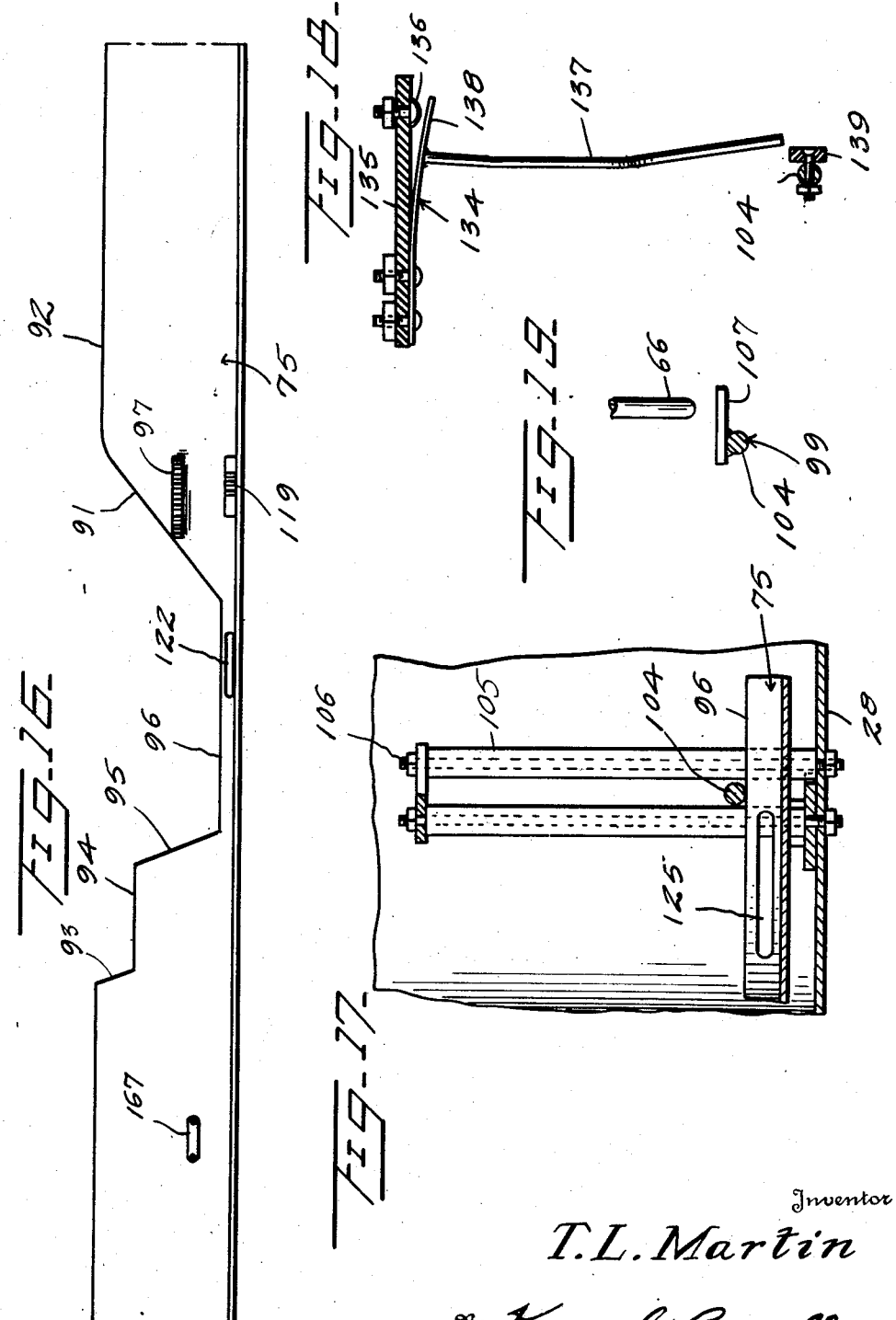

Patented July 28, 1953

2,646,807

UNITED STATES PATENT OFFICE 2,646,807

WATCH CLEANING MACHINE

Theodore L. Martin, Greenville, Ohio

Application May 13, 1947, Serial No. 747,713

11 Claims. (Cl. 134—58)

This invention relates to machines for cleaning watches.

An object of this invention is to provide an improved machine which will automatically operate through a complete cycle to thereby clean and dry the watch parts in a short time.

Another object of this invention is to provide an improved machine of this kind wherein the watch parts are disposed in a removable rotatable perforate basket or receptacle, and a series of cleaning receptacles are periodically moved to a position beneath the basket and then raised and held in raised position so that the basket will rotate in the cleaning solution.

A further object of this invention is to provide a device of this kind wherein the cleaning receptacles are first raised to position the basket in the cleaning solution, and subsequently partially lowered to take the basket out of the solution and permit the excess solution to be centrifugally removed from the basket and watch parts before the cleaning receptacle is completely lowered and another cleaning or drying receptacle is moved to operative position with respect to the basket.

A further object of this invention is to provide a watch cleaning machine of this kind which includes a plurality of closures or lids for the cleaning solution receptacles, which are automatically moved to open position when disposed beneath the rotatable basket, and are spring-pressed to closed position so that the receptacles which are not in operative position will be closed in order that the volatile cleaning and rinsing solutions will not unduly evaporate.

A further object of this invention is to provide in a device of this kind an improved drier which includes an electrical heater which is so constructed and arranged as to quickly heat and to quickly cool.

A further object of this invention is to provide a device of this kind which may be manually started or stopped at any station.

A further object of this invention is to provide an improved basket for the watch parts, which can be easily and quickly removed from the machine so that a number of baskets may be used with each machine in order that the workman need not wait for the the parts of one watch to be cleaned, while he is getting another ready for cleaning. Furthermore, by having a series of baskets for each machine, a single machine may be used by a number of workmen.

An important feature of this invention is the provision of a cam which is continuously rotating through each complete cycle and the periodic movement of the receptacles which are actuated by rotation of the cam, and the latter being formed to elevate the operative receptacle to operative position and maintain such receptacle in its completely elevated position for a predetermined time, after which the operative receptacle is partially lowered for a short period and then completely lowered to inoperative position. The basket motor is adapted to be operated periodically only when a receptacle is in either complete or partial elevated operative position so that the cleaning solution will not be scattered during the changing cycles of the receptacles.

With the above and other objects in view, my invention consists in the arrangement, combination and details of construction disclosed in the drawings and specification, and then more particularly pointed out in the appended claims.

Figure 22:
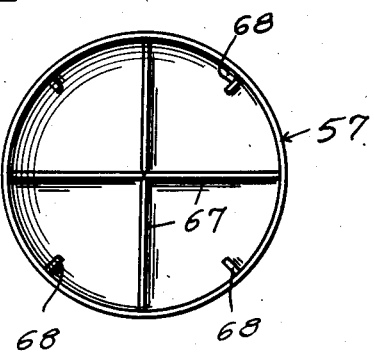
Figure 21:
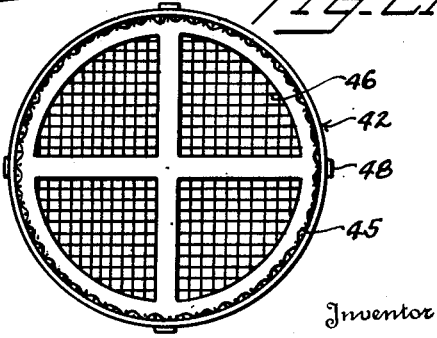

In the drawings,

Figure 1 is a detail front elevation of a watch cleaning machine constructed according to an embodiment of this invention, Figure 2 is a sectional view taken on the line 2—2 of Figure 1, Figure 3 is a vertical section taken on the line 3—3 of Figure 2, Figure 4 is a sectional view taken on the line 4—4 of Figure 3, Figure 5 is a sectional view taken substantially on the line 5—5 of Figure 4, Figure 6 is a fragmentary sectional view taken on the line 6—6 of Figure 5, Figure 7 is a fragmentary sectional view taken on the line 7—7 of Figure 5, Figure 8 is a fragmentary sectional view taken on the line 8—8 of Figure 5, Figure 9 is a fragmentary side elevation showing the closure lifting means, Figure 10 is a fragmentary sectional view taken on the line 10—10 of Figure 4, Figure 11 is a fragmentary sectional view taken on the line 11—11 of Figure 2, Figure 12 is a fragmentary side elevation of the switch associated with the heater, Figure 13 is a fragmentary sectional view taken on the line 13—13 of Figure 11, Figure 14 is a fragmentary sectional view taken on the line 14—14 of Figure 4, Figure 15 is a fragmentary sectional view taken on the line 15—15 of Figure 14, Figure 16 is a side elevation of the cam with the latter laid out straight, Figure 17 is a fragmentary sectional view taken on the line 17—17 of Figure 4, Figure 18 is a fragmentary sectional view taken on the line 18—18 of Figure 3, Figure 19 is a fragmentary sectional view taken on the line 19—19 of Figure 3, Figure 20 is a fragmentary sectional view taken on the line 20—20 of Figure 1, Figure 21 is a plan view of the removable basket, Figure 22 is a plan view of one of the cleaning receptacles, Figure 23 is a fragmentary vertical section through the base portion of the housing, taken on the line 23—23 of Figure 4.

Figure 24 is a diagram of the electrical circuit.

Referring to the drawings, the numeral 25 designates generally a housing which is formed of a cylindrical side wall 26, having an inturned upper flange 27. The side wall 26 is adapted to be secured to a base wall 28, and the latter is formed with a plurality of upwardly extending lugs 29 through which fastening members 30 extend for removably securing the side wall 26 on the base wall 28.

A plurality of supporting feet 31 are secured by fastening means 32 to the base plate 28. An upstanding centrally disposed post or stationary shaft 33 is secured to the base plate 28, and the post 33 being formed at its lower end with a fixed plate 34, secured by fastening means 35 to an elongated bar 36. The bar 36 extends diametrically across the base plate 28 so as to provide a reinforcing means for the post 33. The fastening members 35 secure the bar 36 to the base plate 28, in addition to securing the base plate 34 to the bar 36.

A motor 37 is disposed above the housing 25, being secured to a bracket arm 38 which is formed with a bushing 39 removably secured by fastening members 40 to the upper portion of the post 33. The motor 37 includes a depending motor shaft 41 on the lower end of which a basket, generally designated as 42, is mounted. The basket 42 includes a perforate top wall 43 (Fig. 20) secured by fastening means 44 to the lower end of the shaft 41.

The basket 42 also includes a cylindrical perforate side wall 45 and a perforate bottom wall 46. The cup-shaped member formed by the side wall 45 and the bottom wall 46 is adapted to be removably secured to the top wall or perforate closure 43 by means of a plurality of resilient clips 47, carried by the top wall 43 and engaging an annular rib 48 formed on the upper portion of the removable basket 45 and 46.

The motor 37 is adapted to be periodically operated as will be hereinafter described, to rotate the basket 42 within a cleaning or drying receptacle which is disposed in operative position with respect to the basket.

A circular receptacle carrier or table 49 is rotatably disposed about the post 33, above the housing 25, and includes a circular plate 50 formed with a central boss 51, forming an upper race confronting a lower stationary race 52, secured by means of a locking pin 53 to the post 33. Anti-friction members 54 are interposed between the two race members 51 and 52.

The table 49 also includes an annular outer flange 55 formed with a plurality of keepers or notches 56, the purpose for which will be hereinafter described. The table 49 has mounted on the upper side thereof a plurality of liquid or cleaning receptacles generally designated as 57, and at least one drying or heating receptacle 58. Each cleaning receptacle 57 includes a cylindrical side wall 59, a bottom wall 60, and a swingable closure 61 which is formed with a semicircular flange 62.

Each receptacle 57 is removably mounted in a cup-shaped carrier generally designated as 63. The carrier 63 includes a bottom wall 64 and an annular flange 65 adapted to confine the receptacle 57. The bottom wall 64 has fixed thereto a depending stem 66, slidably engaging through the plate 50 and extending downwardly into the housing 55. The receptacle 57 includes a plurality of angularly arranged bottom baffles 67 and a plurality of vertically disposed side wall baffles 68 secured to the inner side of the cylindrical side wall 59.

The stem 66 also slidably engages through a guide or bushing 69, formed with a lug 70 which is secured by fastening means 71 to a ring-shaped gear 72. Preferably the guide 69 is fixed by soldering or other suitable means to the lower side of the plate 50 so that the ring gear 72 will be supported in downwardly spaced relation from the plate 50.

The ring gear 72 has meshing therewith a smaller driving gear 73 which is fixed to the upper end of a vertical table rotating shaft 74. A rotatable cam, generally designated as 75, is disposed within the housing 25 and includes a lower plate 76 formed with a central bushing 77 loosely engaged about the post 33 and having a spur gear 78 fixed on the upper end thereof.

The gear 78 has meshing therewith a small gear 79 carried by a shaft 80, which is journaled between a pair of flanges 81 and 82 carried by a plate 83 which is fixed on the post 33. The shaft 80 has mounted thereon a gear 80a which has meshing therewith a small gear 84 carried by a shaft 85, also journaled between the flanges 81 and 82 and the shaft 85 has fixed thereon a worm gear 86 with which a driving worm 87 meshes. The driving worm 87 is fixed on a motor shaft 88, connected with a motor 89. The motor 89 operates continuously during each complete cycle of the machine and is fixed on the plate 83.

The gear train formed of the gears 78, 79, 80a, 84, 86 and 87 forms a reduction gearing for rotating the cam 75 through a complete revolution within a predetermined period. The cam 75 also includes an upstanding cam member 90 which is formed with an upwardly inclined elevating surface or edge 91, a relatively long horizontally disposed dwell edge or surface 92, a relatively short lowering surface 93, and a second short dwell surface or edge 94. The cam 75 also includes a final lowering surface or edge 95 which terminates in a lower dwell surface or edge 96.

The outer side of the cam 75 has fixed thereto a relatively long gear rack 97, which is adapted to mesh with a spur gear 98 fixed on the vertical shaft 74. In this manner the table 49 is adapted to be rotated through substantially one-quarter turn for each complete revolution of the cam 75.

In order to provide for elevating one of the cleaning receptacles 57, or the heating receptacle 58, which is disposed in operative position with respect to the basket 42, I have provided a receptacle elevating lever generally designated as 99. The lever 99 includes a substantially U-shaped inner lever portion 100, having the inner leg 101 thereof rockably mounted on bearings 102 and 103 secured to the mounting for the lower motor 89.

The lever 99 also includes an outer arm 104 which is slidably disposed between a pair of vertically disposed guide members 105 which are fixed by fastening means 106 to the base plate 28. The lever member 104 has fixed thereto a laterally extending plate 107 which is in vertical alignment with the shaft 41 and is adapted to engage the lower end of the stem of a receptacle disposed in operative position with respect to the basket 42.

The lever member 104 extends over the upper edge of the cam 75 and is adapted to ride on the cam 75 so as to thereby initially elevate a receptacle disposed in operative position, subsequently hold the elevated receptacle in its operative position, partially lower the elevated receptacle by means of the cam surfaces 93 and 94 to dispose the basket 42 out of the cleaning fluid but still within the upper portion of the operative receptacle and finally lower the operative receptacle to its inoperative position.

When the lever 104 is riding on the cam surface 96 all of the receptacles will be disposed in their lowered inoperative position.

The closures 61 are adapted to be periodically moved to open position and held in open position prior to the elevating of a receptacle to operative position. This movement of each closure is accomplished by securing a vertically disposed shaft 108 to an ear 109 fixed to a closure 61. The shaft 108 is rotatably disposed in a tubular bearing 110 fixed to the upper side of the table 49. The shaft 108 has fixed to the lower end thereof a right angularly disposed arm 111 and a spring 112 engaging about the lower portion of the shaft 108 constantly urges this shaft to rotate in a manner to hold the closure 61 in closed position.

A vertically disposed closure operating shaft 113 is disposed in a bearing 114 carried by upstanding supporting members 115 and has secured to the lower portion thereof a fragmentary spur gear 116. The shaft 113 has fixed to the upper end thereof an L-shaped closure operating arm 117 disposed in the path of the cam 111.

A spring 118 has one end thereof fixed to the bearing bar 114 and the other end fixed to the shaft 113 and constantly urges the shaft 113 to rotate in the direction to swing the arm 117 to inoperative position.

A relatively short gear rack 119 is fixed to the cam 75 below the rack 97 in a path to mesh with the fragmentary gear 116. The fragmentary gear 116 also has fixed thereto a pin 120 which upon rotation of the gear 116 to operative closure opening position, is adapted to engage in an opening 121 formed in the cam 75 on the trailing end of the gear rack 119. After the gear 116 passes the gear rack 119, the pin 120 is adapted to bear against the outer side of the cam 75 so as to thereby hold the arm 117 in closure opening position. In this manner the receptacle disposed in operative position relative to the basket 42 will have the closure thereof held in open position during a complete operative cycle.

The cam 75 also includes an elongated slot 122 in the low portion of the cam below the surface 96 within which the pin 120 is adapted to loosely engage so that the closure which was held in open position during one complete rotation of the cam 75 will be released for spring-pressed swinging under the action of spring 112 to normally closed position.

In order to provide for release of frictional contact between the closure 61 and the upper end of a receptacle 57, I have provided a closure raising cam 123 which is formed in the upper end of the guide or bearing 110 and with which a pin 124, fixed to the shaft 108, is adapted to engage. Each receptacle carrier 63 is also guided in its vertical movement by means of an upstanding guide bar 125 fixed to and extending upwardly from the table 49.

A horizontally extending slide lug 126 is fixed to each carrier 63 and slidably engages the guide rod or bar 125. The heater 58 includes a cylindrical side wall 127 and a bottom wall 128. A laterally projecting lug 129 is fixed to the side wall 127 and slidably engages a guide bar 130 fixed to the upper side of the table 49. A heating element 131 is disposed in the lower portion of the heating receptacle 58 and is adapted to be connected periodically to a source of electric current supply as will be hereinafter described. A tubular stem 132 is fixed to the bottom wall 128 of the receptacle 58, and is formed with a closed end 133 for engagement with the lifting arm or plate 107.

The basket operating motor 37 is connected with a source of electric current supply only at the time a receptacle, that is either a cleaning or drying receptacle, is raised to operative position by means of a switch generally designated as 134. The switch 134 includes an insulating plate 135 fixed to the upper flange 81 of the mount for the motor 89, and a stationary contact 136 is carried by the insulating plate 135.

An elongated cam-shaped or bowed arm 137 is fixed to a resilient or movable contact 138 extending downwardly from the latter and disposed in the path of the upward movement of the lever arm 104. The arm 104 has fixed thereto and insulating plate 139 adapted to slidably contact with the cam bar 137 upon upward swinging of the lever 104.

A main switch generally designated as 140 is secured to an insulating block 141, secured by fastening means 142 to the inner side of the housing 25. The switch 140 includes a stationary contact bar 143 and a movable contact bar 144. An inwardly projecting arm 145 is fixed to the movable contact bar 144 and has fixed to the inner end thereof an upstanding insulating arm 146. A switch lever 147 is pivotally mounted on a pivot 148 carried by a bushing or housing 149 which is fixed to the housing 25. The lever 147 has fixed thereto an upstanding pin 150 which has fixed thereto a cam arm 151.

The cam arm 151 is adapted upon movement of the lever 147 to the left, as viewed in Figure 15, to engage the upstanding insulated arm 146 and move this arm inwardly so as to move the contact bar 144 to circuit breaking position.

In order to resiliently hold the lever 147 in either circuit closing or circuit breaking position, I have provided a longitudinally bowed spring 152 which is fixed by fastening means 153 to the inner side of the housing 25 and is adapted to engage on the outer concave side thereof the pin 150. The switch lever 147 is also adapted to be automatically moved to circuit breaking position by means of a switch operating button or lug 154 which is fixed to the lower side of the table 49 and which is adapted to engage an upstanding pin 155 carried by the inner end of the lever 147.

The table 49 is adapted to be releasably locked against rotation during the time that a receptacle is disposed in operative position relative to the basket 42. This is accomplished by means of a locking pin 156 which engages in a notch or keeper 56 formed in the flange 55 of the table 49. The locking pin 156 is fixed to a vertically disposed arm or button 157 carried by a lever 158. The lever 158 is fixed to a shaft 159 which is rockably mounted in an upstanding post 160.

The post 160 is fixed to the bottom plate 28 outside of the cam 75. A spring 161, secured at one end to the lever 158 and at the other end to a hook 162, fixed to the post 160, constantly urges the lever 158 at its upper end to rock upwardly and hold the pin or bolt 156 in locking position.

The lever 158 is adapted to be periodically rocked downwardly at its upper end to released position by means of a cam lever 163 which is fixed to a shaft 164 journaled through the lower portion of the post 160. A shaft 164 also has extending laterally therefrom a lever 165 with which the lower end of an adjustable link 166 is adapted to be connected. The upper end of the link 166 is connected to the lever 158 on the opposite side of the shaft 159 from the spring 161.

The cam lever 163 extends inwardly in the direction of the cam 75 and is disposed in the path of an outwardly projecting cam lever operating lug 167 which is fixed to the outer side of the cam 75. The lug or cam lever operator 167 is adapted to engage the cam lever 163 prior to the time that the gear rack 97 engages the gear 98. The lug 167 is of such length as to hold the cam lever 163 in pin releasing position long enough until the table 49 begins to rotate at the time the gear rack 97 engages the table rotating gear 98. After the table is initially released and starts rotating, the locking pin 156 will ride on the lower edge of the flange 55 until the succeeding keeper notch 56 comes into registry with the locking pin. At this latter time, the gear 97 is just riding past the gear 98 with the trailing tooth disengaged from the latter gear so that table 49 can be locked against rotation until cam 75 makes another complete revolution.

At the time the heater 58 is disposed in operative position and the heater is raised to encompass the basket 42, the heater 131 is adapted to be connected to a source of electric current supply by means of a switch generally designated as 168 (Fig. 12). The switch 168 includes a pair of contacts 169 and 170 which are of substantially V-shape and are fixed to terminals 171 carried by the insulating plate 135. A pair of movable resilient contacts 172 and 173 are fixed to an insulating plate 174 carried by a bushing 175 which is fixed to the tubular stem 132. When the receptacle 58 is in its completely raised position, the contacts 172 and 173 engage contacts 169 and 170 so as to thereby close the heater circuit to the heater 131.

The main switch 140 is interposed in a conductor 174 which is connected at one end to a supply source, and at the other end is connected to one side of the motor 89. A second conductor 175 connects the other side of the motor 89 with the other side of the electric supply source. A pair of conductors 176 and 177 are connected to the conductors 184 and 185 and are connected respectively to contacts 169 and 170.

A conductor 178 is connected between conductor 176 and one side of motor 37, and a second conductor 179 is connected to the opposite side of motor 37 and to conductor 177. The top motor switch 134 is interposed in conductor 179 and a fixed resistance unit 180 is interposed in conductor 179 between switch 134 and conductor 177 so that the speed of motor 37 may be reduced to the desired degree. A pair of conductors 181 and 182 are connected respectively to contacts 172 and 173 and to the heating unit 131.

In the use and operation of this device, the watch parts are placed in the perforate basket 42, the removable portion of the basket being snapped into the resilient clips 47 from below. It will be understood that the basket may be formed with suitable upstanding partitions for holding the watch parts in desired compartments so that the heavier parts will not injure the lighter parts.

The device is started in operation by moving switch lever 147 to the right at its upper end, as viewed in Figure 15, thereby releasing spring contact member 144 to circuit closing position. Motor 89 will thereby be placed in the electric circuit and will start cam 75 rotating in a clockwise direction, as viewed in Figure 4.

The desired cleaning liquid may be placed in the three receptacles 57, the first one of these receptacles being the initial cleaning receptacle, whereas the next two receptacles are the rinsing receptacles. The first receptacle, which is disposed in alignment with the basket 42, is raised to operative position when cam lever 104 rides upwardly on the elevating surface 91 of the cam 75. Immediately prior to the elevation of the receptacle 57 the associated closure 61 is swung to open position by means of the closure opening gear rack 119, which engages the fragmentary gear 116. The closure will be maintained in this open position by sliding contact of holding pin 120 with the outer side of cam 75.

When lever 104 is raised by the cam 75, the switch 134 will be closed by engagement of cam arm 137 with lever 104. Motor 37 will then operate to rotate the basket 42 within the now open receptacle. Cam lever 104 will ride over the long dwell surface 92 of cam 75, during which period basket 42 will be rotated within the cleaning solution.

At the end of the dwell surface 92, lever 104 will drop downwardly on inclined cam surface 93 and engage the short dwell surface 94. When lever 104 is riding on the horizontal dwell surface 94, receptacle 57 is in partially lowered position with the basket 42 rotating above the cleaning fluid. In this manner the cleaning solution will be centrifugally removed from the basket and the watch parts, prior to rotation of the table 49 to the next receptacle.

After the first cleaning cycle is completed by lever 104 riding downwardly on the lowering surface 94 and engaging the lower horizontal dwell 95, cam 75 will effect release of the table locking pin 156 by engagement of the cam lever 163 with the releasing lug 167 fixed to the outer side of the cam 75. At the time the locking pin 156 is in its released position, gear rack 97 will engage table rotating gear 98 so as to rotate the table through a one-quarter turn and bring the next receptacle in registry or alignment with the basket 42. After the table 49 has rotated through three intermediate cycles wherein the fluid receptacles 57 have been raised and subsequently lowered with respect to the basket 42, the drying receptacle 58 is moved into registry with basket 42 and raised by lever 104. When the drying receptacle 58 is elevated to operative position, switch 168 is closed to the heater 131 so as to quickly heat the interior of this drying receptacle for finally drying the watch parts and the basket.

If it is desired to manually rotate table 49, this may be accomplished by pressing releasing button 157 downwardly to swing locking pin 156 to released position and then manually turning table 49 to the desired position. In this manner the machine may be started at any selected point in its complete cyclic operation. When table 49 makes a complete rotation, button 154 will engage pin 155 so as to thereby move switch 140 to circuit breaking position and thereby stop motor 89.

I do not mean to confine myself to the exact details of construction herein disclosed, but claim all variations falling within the purview of the appended claims.

What I claim is:

1. In a cleaning machine comprising a base, a rotatable table carried by said base having a series of downwardly opening apertures formed therein equidistantly from the axis of rotation of the table, a perforate article holder disposed above the table, means for rotating said holder at a given elevation, a plurality of spaced receptacles carried by said table having dependent means slidably extending through said apertures, said article holder being directly above a point in the orbit of rotation of said receptacles, means for rotating the table to successively align the receptacles with said holder, elevating means engageable with said dependent means to successively elevate the receptacles to encompass said holder, said elevating means having a cammed lever engageable with each dependent means, said cam means engaging said lever having a plurality of positions for rocking said lever to a full elevated position to immerse the holder in fluid carried by a receptacle for a given period and to partially lower said receptacle for rotation of the holder within the receptacle above the fluid therein, and control means for periodic operation of said elevating means coordinated with rotation of the holder, and cover means for said receptacles having hinge means intermittently operative from cover closed to cover open positions as each receptacle is moved into and out of alignment with said holder, said hinge means having rotatable pivot members selectively engageable with said elevating means for limited rotation of said pivot members.

2. In a cleaning machine comprising a base, a rotatable table carried by said base having a series of downwardly opening apertures formed therein equidistantly from the axis of rotation of the table, a perforate article holder disposed above the table, means for rotating said holder at a given elevation, a plurality of spaced receptacles carried by said table having dependent means slidably extending through said apertures, said article holder being directly above a point in the orbit of rotation of said receptacles, means for rotating the table to successively align the receptacles with said holder, elevating means engageable with said dependent means to successively elevate the receptacles to encompass said holder, said elevating means having a cam lever means engageable with said dependent means, said cam lever means having a plurality of positions for raising each of said receptacles to a full elevated position to immerse the holder in fluid carried by a receptacle for a given period and to partially lower said receptacle for rotation of the holder within the receptacle above the fluid therein, and control means for periodic operation of said elevating means coordinated with rotation of the holder, and cover means for said receptacles having hinge means intermittently operative from cover closed to cover open positions as each receptacle is moved into and out of alignment with said holder, said hinge means having rotatable pivot members selectively engageable with said elevating means for limited rotation of said pivot members, and locking means extending between said table and the base for locking the table in successive positions.

3. In a cleaning machine comprising a base, an upstanding post fixed to said base, a rotatable article holding basket carried by said post and spaced above said base, means for rotating said basket, fluid receptacle means disposed below said basket and rotatably alignable therewith in sequence, each of said receptacles having a dependent member, an elevating means engageable with said members to successively elevate each receptacle for immersion of the basket in a fluid contained therein, said elevating means having an intermediate position for partial lowering of the receptacle to a fluid free position, power means drivingly connected thereto, timing means connecting said basket rotating means in circuit with said power means to effect rotation of the basket during enclosure by a receptacle, and locking means engaging with said elevating means to hold said receptacles against movement for each predetermined period of alignment with the basket.

4. A cleaning machine comprising a base, a table rotatably carried by said base, means for rotating said table, an article holder disposed above said table, means for rotating said holder, a plurality of receptacles equidistantly from the axis of rotation of the table carried by said table, cam means disposed under the table, dependent lift means carried by each receptacle, said lift means being operatively connected with said cam to raise each receptacle in sequence to a holder enclosing position on rotation of said table, said holder being directly above a point in the orbit of rotation of the receptacles, said cam having an intermediate level for partial lowering of each receptacle to provide for rotation of said holder within the receptacles above a fluid level thereof, and timing means connecting said holder rotating means with the table rotating means whereby rotation of the holder is effected on raising of a receptacle to a holder enclosing position.

5. A device as defined by claim 4 wherein at least one of said receptacles is provided with heating means operative by said timing means on raising of said heated receptacle.

6. In a cleaning machine having a cleaning basket, a motor for rapidly rotating said basket at a given elevation, fluid containing means comprised of a series of receptacles normally disposed below said basket and movable horizontally to bring each receptacle into individual vertical alignment with said basket, cam actuated elevating means disposed under said basket to elevate each said receptacle positioned thereunder to a basket encompassing position to engage fluid in said receptacle with the basket, said cam having a plurality of engaging surfaces disposed to effect full and intermediate elevation of each receptacle for operation of the basket within said each receptacle in and out of engageemnt of a fluid therein, cover means swingingly mounted over each receptacle, said cover means having dependent actuating means cooperatively engageable with said cam means to swing the cover of a receptacle to open position on movement of said receptacle for raising, power means for operation thereof, and switch means for coordinatedly connecting said motor and power means to effect continuous operation of the elevating means with operation of the basket during encompassment thereof by each receptacle.

7. In a cleaning machine comprising a base, a rotatable perforate article holder disposed above said base, means for rotating said holder, a plurality of fluid receptacles adapted for movement into sequential vertical alignment with said holder, cam means carried by said base with receptacle positioning means operative by said cam to periodically raise each of said receptacles to a holder enclosing and fluid engaging position and lower said each receptacle to a partially lowered enclosed position thence to a completely lowered position in predetermined timed periods of operation, said base having a rotatable post adjacent each receptacle, intermittent means for rotating each post connected to each post and operative on movement of the receptacles, a cover carried by each of said posts for swinging movement over an adjacent receptacle, each of said covers being operative on said rotation of each respective post to rotate to an open position on raising of the receptacle covered, and connecting means extending between said post rotating means and the base for effecting said intermittent rotation.

8. A cleaning machine comprising a base, an upstanding shaft fixed relative to said base, a table rotatably carried by said shaft, a plurality of receptacles on the upper side of said table disposed equidistantly from the axis of rotation of the table and in circumferentially spaced apart relation, each of said receptacles being adapted to hold a predetermined quantity of cleaning fluid, a depending stem extending from each of said receptacles and slidably engaging through said table, a rotatable article holder above said table positioned directly above a point in the orbit of rotation of the receptacles for rotating said holder, releasable latching means for locking said table with each receptacle beneath said holder, a rockable cam lever below said table disposed in a position to engage the lower end of said stem of the receptacle positioned beneath said holder, a rotatable cam member engaging said lever whereby to rock the latter to thereby first elevate said receptacle positioned beneath the holder to encompass and submerge said holder and subsequently lower said receptacle, said cam member having an intermediate level to effect partial lowering of said receptacle whereby the article holder is lowered to an operative position within the receptacle free of the fluid therein, and means for periodically rotating said table in step-by-step movement.

9. A cleaning machine comprising a base, an upstanding shaft fixed relative to said base, a table rotatably carried by said shaft, a plurality of receptacles on the upper side of said table disposed equidistantly from the axis of rotation of the table and in circumferentially spaced apart relation, a depending stem extending from each of said receptacles and slidably engaging through said table, a rotatable article holder above said table positioned directly above a point in the orbit of rotation of the receptacles, means for rotating said holder, releasable latching means for locking said table with each receptacle successively beneath said holder, a rockable cam lever below said table disposed in a position to engage the lower end of said stem of each receptacle positioned beneath said holder, a rotatable cam member having a plurality of engageable surfaces in stepped relation to each other engaging said lever whereby to rock the latter to thereby first elevate said receptacle positioned beneath the holder to encompass and submerge said holder and subsequently progressively lower said receptacle, and means for periodically rotating said table in step-by-step movement, said latter named means including a gear rack carried by said cam member.

10. A cleaning machine comprising a base, an upstanding shaft fixed relative to said base, a table rotatably carried by said shaft, a plurality of receptacles on the upper side of said table disposed equidistantly from the axis of rotation of the table and in circumferentially spaced apart relation, a depending stem extending from each of said receptacles and slidably engaging through said table positioned directly above a point in the orbit of rotation of the receptacles, a rotatable article holder above said table, means for rotating said holder, releasable latching means for locking said table with each receptacle successively beneath said holder, a rockable cam lever below said table having different elevation surfaces disposed in a position to successively engage the lower end of said stem of each receptacle positioned beneath said holder, a rotatable cam member engaging said lever whereby to rock the latter to thereby first elevate said receptacle positioned beneath the holder to encompass and submerge said holder and progressively subsequently lower the receptacle, and means for periodically rotating said table in step-by-step movement, said latter named means including a gear rack fixed relative to said cam member and operative connections between said rack and said table.

11. A cleaning machine comprising a base, an upstanding shaft fixed relative to said base, a table rotatably carried by said shaft, a plurality of receptacles on the upper side of said table disposed equidistantly from the axis of rotation of the table and in circumferentially spaced apart relation, a depending stem extending from each of said receptacles and slidably engaging through said table positioned directly above a point in the orbit of rotation of the receptacles, a rotatable article holder above said table, means for rotating said holder, releasable latching means for locking said table with each receptacle successively beneath said holder, a rockable cam lever below said table disposed in a position to engage the lower end of said stem of each receptacle positioned beneath said holder, a rotatable cam member having a plurality of stepped surfaces engaging said lever whereby to rock the latter to thereby first elevate said receptacle positioned beneath the holder to encompass and submerge said holder, and subsequently and progressively lower said receptacle, and means for periodically rotating said table in step-by-step movement, said latter named means including a vertical shaft rotatably carried by said base, a pair of gears fixed on said latter named shaft, a gear fixed relative to said table, meshing with one of said pair of gears and a gear rack carried by said cam member engageable with the other of said pair of gears.

THEODORE L. MARTIN.

References Cited in the file of this patent

UNITED STATES PATENTS

| Number | Name | Date |
|---|---|---|
| 1,139,313 | Stevens | May 11, 1915 |
| 1,896,648 | Thomas | Feb. 7, 1933 |
| 1,934,019 | Thew | Nov. 7, 1933 |
| 2,102,819 | Ronci | Dec. 21, 1937 |
| 2,195,123 | Pabst | Mar. 26, 1940 |